(12) United States Patent
Suzuki

(10) Patent No.: US 8,482,840 B2
(45) Date of Patent: Jul. 9, 2013

(54) DISPLAY DEVICE

(75) Inventor: Katsutoshi Suzuki, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 27 days.

(21) Appl. No.: 13/194,774

(22) Filed: Jul. 29, 2011

(65) Prior Publication Data

US 2012/0069420 A1   Mar. 22, 2012

(30) Foreign Application Priority Data

Sep. 17, 2010   (JP) .................. 2010-208850

(51) Int. Cl.
*G02F 1/153*   (2006.01)
(52) U.S. Cl.
USPC ............ 359/270; 359/267; 359/273; 359/274
(58) Field of Classification Search
USPC ................................ 359/265–275
See application file for complete search history.

(56) References Cited

U.S. PATENT DOCUMENTS

2012/0200908 A1*  8/2012  Bergh et al. .................. 359/275

FOREIGN PATENT DOCUMENTS

| JP | 1-277825 | 11/1989 |
| JP | 2010-66585 | 3/2010 |

* cited by examiner

*Primary Examiner* — Evelyn A. Lester
(74) *Attorney, Agent, or Firm* — Beyer Law Group LLP

(57) ABSTRACT

A display device of this embodiment includes a first insulating substrate having a display surface; a first resistive layer disposed on a surface of the first insulating substrate, the surface being opposite the display surface; a first electrochromic layer disposed on a surface of the first resistive layer; an electrolyte layer disposed on a surface of the first electrochromic layer; and a plurality of first electrodes connected to the first resistive layer. In the display device, a voltage is applied to the plurality of first electrodes so that a voltage gradient is generated in an in-plane direction of the first resistive layer.

5 Claims, 4 Drawing Sheets

DISPLAY DEVICE

CLAIM OF PRIORITY

This application claims benefit of Japanese Patent Application No. 2010-208850 filed on Sep. 17, 2010, which is hereby incorporated by reference.

BACKGROUND OF THE INVENTION

1. Field of the Invention

The present invention relates to a display device including an electrochromic layer.

2. Description of the Related Art

Display devices utilizing electrochromism in which color changes through an electrochemical oxidation-reduction reaction have been known. In such display devices utilizing electrochromism, long-duration display at low voltage, long life, and the like can be expected.

For example, Japanese Unexamined Patent Application Publication No. 1-277825 (Patent Document 1) discloses an invention of an electrochromic light controlling plate in which counter electrodes (resistive films) and coloring films are disposed on inner surfaces of substrates facing each other and a space between the coloring films is filled with an electrolyte.

In Patent Document 1, a first electrode drawn portion and a second electrode drawn portion are further disposed at both ends of each of the counter electrodes. After a coloring voltage is applied to the first electrode drawn portion until a colored region of the coloring film reaches a predetermined region, the application of a decolorizing voltage to the second electrode drawn portion and the application of a coloring voltage to the first electrode drawn portion are alternately performed in a repeated manner. Thus, the colored region can be retained in only part of the coloring film.

However, in the invention disclosed in Patent Document 1, after the colored region of the coloring film has reached a predetermined region, the application of a decolorizing voltage to the second electrode drawn portion and the application of a coloring voltage to the first electrode drawn portion are alternately performed in a repeated manner. Therefore, the colored region is easily fluctuated, resulting in unstable displaying. Furthermore, a relatively large screen causes no problem, but, in a small screen, it is believed to be quite difficult to alternately time-control the application of a coloring voltage and the application of a decolorizing voltage so that only part of the colored region is retained.

In an invention disclosed in Japanese Unexamined Patent Application Publication No. 2010-66585 (Patent Document 2), the display speed in a display region is changed by changing the distance between counter electrodes. However, it is believed to be quite difficult to control the distance between the counter electrodes so that the display speed has an optimum difference. In addition, various different displays cannot be achieved in the configuration disclosed in Patent Document 2. The invention disclosed in Patent Document 2 can be applied to only a display form in which coloration gradually proceeds. That is, it is impossible to retain only part of the colored region. For example, the display form shown in FIG. 2(b) of Patent Document 2 cannot be retained.

SUMMARY OF THE INVENTION

Accordingly, the present invention provides a display device that can stably and easily achieve a chromatic display such as a gradation display other than a monochrome display.

A display device of the present invention includes a first substrate having a display surface; a first resistive layer disposed on a surface of the first substrate, the surface being opposite the display surface; a first electrochromic layer disposed on a surface of the first resistive layer; an electrolyte layer disposed on a surface of the first electrochromic layer; and a plurality of first electrodes connected to the first resistive layer, wherein a voltage is applied to the plurality of first electrodes so that a voltage gradient is generated in an in-plane direction of the first resistive layer.

In the present invention, a voltage gradient is generated in an in-plane direction of the first resistive layer. Therefore, a uniform chemical reaction is not caused on the entire surface of the first electrochromic layer, and a chemical reaction can be gradually changed between oxidation and reduction or the reaction rate can be changed in accordance with the voltage gradient. As a result, not only a monochrome display in which a change in color is realized by changing between a colored state and a decolorized state but also a gradation display in which a shade of color is gradually changed can be achieved in the entire surface of the first electrochromic layer. Furthermore, by changing the arrangement and number of the first electrodes, various chromatic displays other than a monochrome display can be achieved.

In the present invention, polarity can be reversed when a voltage is applied to the plurality of first electrodes connected to the first resistive layer or a voltage value applied to the first electrodes can be easily changed. Therefore, various display forms can be stably and easily achieved. That is, the size and position of a gradation region can be changed, a partly colored state can be retained, or a colored region can be gradually changed over time.

In the present invention, the first electrodes are preferably disposed on at least both ends of the first resistive layer. This can generate a voltage gradient between both ends of the first resistive layer. Thus, a chromatic display other than a monochrome display can be achieved in a wide area between both ends of the first electrochromic layer.

In the present invention, preferably, the display device further includes a second substrate facing the first substrate with a space therebetween in a height direction; a second resistive layer disposed on a surface of the second substrate; and a plurality of second electrodes connected to the second resistive layer, wherein the electrolyte layer is disposed between the first electrochromic layer and the second resistive layer while the first electrochromic layer and the second resistive layer face each other; a voltage is applied between the second electrodes and the first electrodes connected to the first resistive layer; and different voltages are applied at a plurality of feeding portions each constituted by one of the first electrodes connected to the first resistive layer and a corresponding one of the second electrodes connected to the second resistive layer to generate a voltage gradient in the first resistive layer positioned between the first electrodes having different applied voltages. This can stably and easily generate a voltage gradient in the first resistive layer, and a chromatic display other than a monochrome display can be stably achieved.

In the display device above according to the present invention, the voltage gradient may be generated in both the first resistive layer and the second resistive layer. In addition, the display device may further include a second electrochromic layer disposed on a surface of the second resistive layer, wherein the electrolyte layer may be disposed between the first electrochromic layer and the second electrochromic layer.

In the present invention, by applying a positive voltage to the first electrodes of some of the feeding portions and applying a negative voltage to the first electrodes of other feeding portions, a voltage gradient may be generated in the first resistive layer positioned between the first electrodes to which the positive voltage has been applied and the first electrodes to which the negative voltage has been applied while a voltage gradient opposite to the voltage gradient of the first resistive layer may be generated in the second resistive layer.

DESCRIPTION OF THE PREFERRED EMBODIMENTS

Figure 1A:
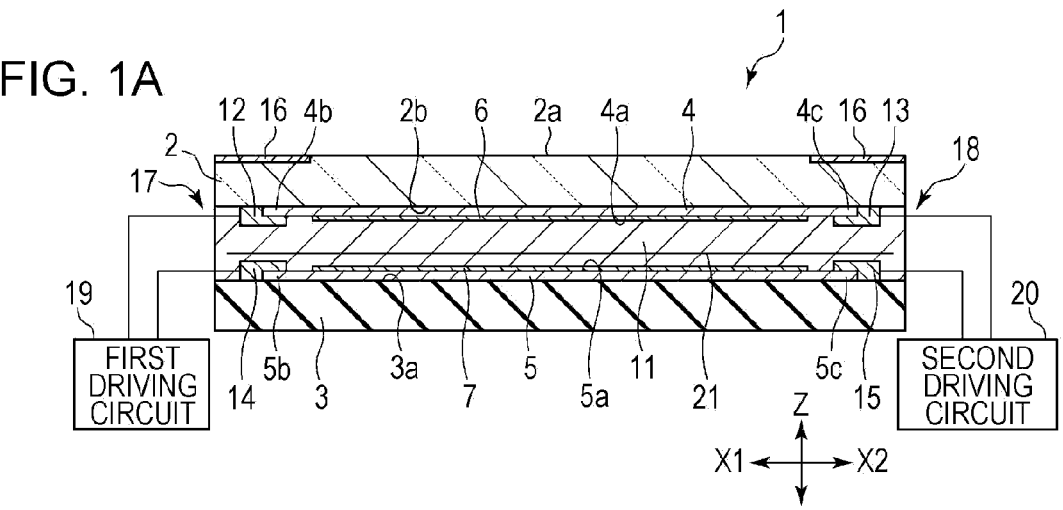
FIG. 1A is a partial longitudinal sectional view of a display device according to a first embodiment of the present invention.
Figure 1B:
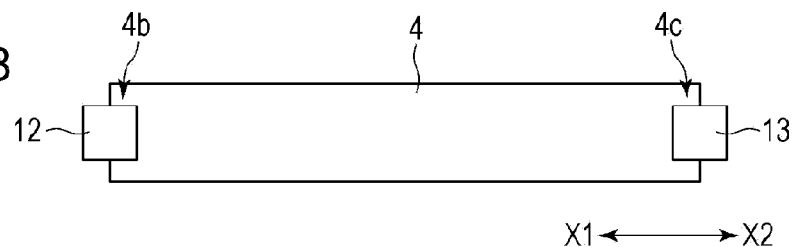
FIG. 1B is a plan view of a first resistive layer and first electrodes shown in FIG. 1A.
Figure 1C:
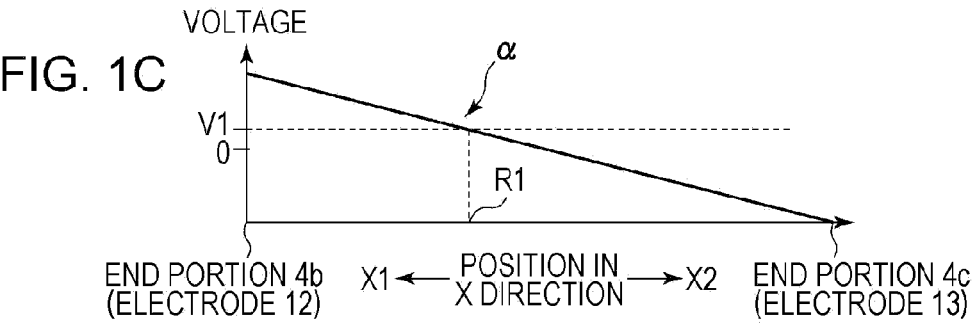
FIG. 1C is a schematic view of a distribution of voltage applied to the first resistive layer.
Figure 1D:
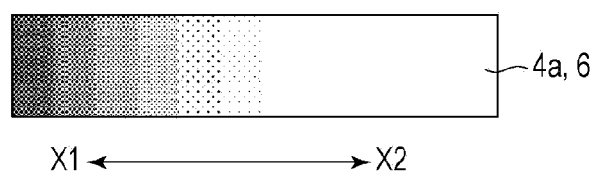
FIG. 1D is a schematic view of a gradation display viewed from a display surface.

FIG. 1A is a partial longitudinal sectional view of a display device according to a first embodiment of the present invention. FIG. 1B is a plan view of a first resistive layer and first electrodes shown in FIG. 1A. FIG. 1C is a schematic view of a distribution of voltage applied to the first resistive layer. FIG. 1D is a schematic view of a gradation display viewed from a display surface.

As shown in FIG. 1A, a first insulating substrate 2 and a second insulating substrate 3 constituting a display device 1 face each other with a space therebetween in the height (Z) direction.

The outer surface of the first insulating substrate 2 is a display surface 2a. As shown in FIG. 1A, the entire outer surface of the first insulating substrate 2 is not necessarily the display surface 2a. For example, a decorative layer 16 may be formed on the periphery of the display surface 2a. Consequently, a portion of the display surface 2a becomes translucent and a portion of the decorative layer 16 becomes opaque.

A resin film or a glass substrate can be preferably applied to the first insulating substrate 2. Examples of the resin film include a polyethylene terephthalate (PET) film, a polyethylene naphthalate (PEN) film, a polyphenylene sulfide (PPS) film, and a polycarbonate (PC) film. The same material can also be used for the second insulating substrate 3, but such a material is not necessarily transparent.

The first insulating substrate 2 having the display surface 2a is a transparent substrate. Herein, the terms "transparent" and "translucent" mean that the transmittance of visible light is 60% or more (preferably 80% or more).

As shown in FIG. 1A, a first resistive layer 4 is disposed on an inner surface (a surface opposite the display surface) 2b of the first insulating substrate 2. Furthermore, a second resistive layer 5 is disposed on an inner surface 3a of the second insulating substrate 3.

The first resistive layer 4 and the second resistive layer 5 are each formed of a transparent resistive film. The material is not particularly limited, and indium tin oxide (ITO) is preferably used. These resistive layers 4 and 5 are disposed on the inner surfaces of the insulating substrates 2 and 3, respectively, by a known method such as sputtering.

The shape of the resistive layers 4 and 5 is not particularly limited and can be determined in accordance with the usage form or the like. For example, the resistive layers 4 and 5 may have a rectangular shape show in FIG. 1B.

A first electrochromic layer 6 is disposed on a surface (a surface facing the second insulating substrate 3) 4a of the first resistive layer 4.

A second electrochromic layer 7 is disposed on a surface (a surface facing the first insulating substrate 2) 5a of the second resistive layer 5.

The electrochromic layers 6 and 7 each include an electrochromic material (electrochromic dye) and a supporting body (e.g., nanoparticles of a metal oxide, a porous material, or the like) that can support the electrochromic material. Any electrochromic material can be used as long as the electrochromic material shows a reversible color change (electrochromism, change between colored state and decolorized state) through an electrochemical oxidation-reduction reaction. An example of the electrochromic material is a known electrochromic compound based on a metal complex, a metal oxide, or a polymer. An example of the metal complex is a Prussian blue complex. The Prussian blue complex is pulverized into nanoparticles to form an ink, whereby the electrochromic layers 6 and 7 composed of the electrochromic material can be formed by printing or the like. Thus, the electrochromic layers 6 and 7 can be easily formed on the surfaces of the resistive layers 4 and 5, respectively, with a thickness smaller than those of the resistive layers 4 and 5.

As shown in FIG. 1A, an electrolyte layer 11 is disposed between the insulating substrates 2 and 3 (a space between the insulating substrates 2 and 3 is filled with an electrolyte layer 11). The electrolyte layer 11 is in contact with the first electrochromic layer 6 and the second electrochromic layer 7. Not only a liquid electrolyte but also a gel electrolyte or a solid electrolyte can be used. Examples of the electrolyte include perchlorates, iron complexes, metal halides, alkali metal salts, and alkaline earth metal salts. Examples of a solvent include ethers, carbonates, and alcohols.

As shown in FIGS. 1A and 1B, first electrodes 12 and 13 are electrically connected to an X1-side end portion 4b and an X2-side end portion 4c of the first resistive layer 4 in the X1-X2 direction, respectively. As shown in FIG. 1A, the first electrodes 12 and 13 are each disposed so as to extend from the surface 4a of the first resistive layer 4 to the inner surface 2b of the first insulating substrate 2. However, the first electrodes 12 and 13 may be disposed on only the surface 4a of the first resistive layer 4. Alternatively, the first electrodes 12 and 13 may be electrically connected to the X1-side end portion 4b and the X2-side end portion 4c of the first resistive layer 4, respectively, so as to face the side surfaces of the end portions 4b and 4c.

As shown in FIG. 1A, second electrodes 14 and 15 are electrically connected to an X1-side end portion 5b and an X2-side end portion 5c of the second resistive layer 5 in the X1-X2 direction, respectively.

The first electrode 12 and the second electrode 14 face each other in the height (Z) direction and constitute a first feeding portion 17. Similarly, the first electrode 13 and the second electrode 15 face each other in the height (Z) direction and constitute a second feeding portion 18. The first electrode 12 and the second electrode 14 may be misaligned to a degree when viewed in plan. The first electrode 13 and the second electrode 15 may also be misaligned to a degree when viewed in plan.

As shown in FIG. 1A, a first driving circuit 19 is connected to the first feeding portion 17. A second driving circuit 20 is connected to the second feeding portion 18.

The electrodes 12 to 15 are suitably composed of a conductive material having an electrical resistance value lower than those of the resistive layers 4 and 5. In the case where the electrodes 12 to 15 are disposed in an opaque region located below the decorative layer 16 as shown in FIG. 1A, the electrodes 12 to 15 can be composed of a conductive material having no transparency.

In the embodiment shown in FIG. 1A, the first driving circuit 19 and the second driving circuit 20 can be independently driven. For example, the first driving circuit 19 applies a positive voltage to the first electrode 12 and the second driving circuit 20 applies a negative voltage to the first electrode 13 in a synchronized manner. Thus, as shown in FIG. 1C, a voltage gradient a in which a voltage is gradually changed in the X1-X2 direction is generated between the end portions 4b and 4c of the first resistive layer 4 (between the first electrodes 12 and 13). The voltage gradient a is generated in the arrangement direction (in-plane direction) of the first electrodes 12 and 13.

Although the voltage gradient a is linearly illustrated in FIG. 1C, the voltage gradient α may be curved depending on the shape of the first resistive layer 4. The same applies to voltage gradients shown in FIGS. 2A to 2C.

A voltage V1 shown in FIG. 1C is a coloring voltage (threshold voltage). In the X1-side region of the first electrochromic layer 6, the -side region having a voltage higher than the voltage V1, oxidation is caused due to the movement of charges of the electrolyte layer 11. For example, when the first electrochromic layer 6 contains a Prussian blue complex, the first electrochromic layer 6 turns blue. FIG. 1D schematically shows the colored state. Note that FIG. 1D is a schematic view showing the colored state of the first electrochromic layer 6 viewed from the display surface 2a. As shown in FIG. 1C, since the voltage gradually decreases from the X1-side end portion 4b (first electrode 12) to the X2-side end portion 4c (first electrode 13) of the first resistive layer 4, the oxidation reaction of the first electrochromic layer 6 also gradually weakens with the decrease of the voltage. Consequently, as shown in FIG. 1D, the color gradually becomes lighter from the X1-side end portion 4b toward the X2-side end portion 4c (the colored state weakens).

As shown in FIG. 1C, in the X2-side region of the first resistive layer 4, the voltage is lower than the coloring voltage V1. Thus, in the first electrochromic layer 6, a reduction reaction preferentially proceeds, and the color disappears (becomes transparent) as shown in FIG. 1D.

As shown in FIG. 1D, the colored state of the first electrochromic layer 6 can be shown as a gradation display in which a shade of color is changed in the X1-X2 direction. Conventionally, the color of the first electrochromic layer 6 has been a choice between a colored state and a decolorized state. However, this embodiment allows an analog chromatic display such as a gradation display, instead of a monochrome display.

In the display device 1 shown in FIG. 1A, a voltage gradient opposite to that of the first resistive layer 4 is generated in the second resistive layer 5, and an oxidation-reduction reaction opposite to that of the first electrochromic layer 6 is caused to proceed in the second electrochromic layer 7. Thus, when the second electrochromic layer 7 contains a Prussian blue complex like the first electrochromic layer 6, the X2-side region turns blue and the X1-side region is decolorized unlike the first electrochromic layer 6.

As shown in FIG. 1A, a reflective layer 21 composed of titanium oxide or the like is disposed between the first electrochromic layer 6 and the second electrochromic layer 7 so that the chromatic display of the second electrochromic layer 7 does not overlap the chromatic display of the first electrochromic layer 6 when viewed from the display surface 2a. Thus, only the first electrochromic layer 6 can be displayed.

For example, in the case where the second electrochromic layer 7 is not disposed unlike the case shown in FIG. 1A or in the case where the chromatic display of the first electrochromic layer 6 is allowed to overlap the chromatic display of the second electrochromic layer 7 when viewed from the display surface 2a by changing the electrochromic material used for the second electrochromic layer 7 to an electrochromic material different from that of the first electrochromic layer 6, the reflective layer 21 is not necessarily disposed.

In this embodiment, a voltage gradient may be generated in the second resistive layer 5 together with the first resistive layer 4. Herein, the second resistive layer 5 may be used as only an electrode plate of the oxidation-reduction reaction caused between the first resistive layer 4 and the second resistive layer 5. Alternatively, various display forms may be obtained with the first electrochromic layer 6 and the second electrochromic layer 7 using the voltage gradient generated in the second resistive layer 5.

Figure 2A:
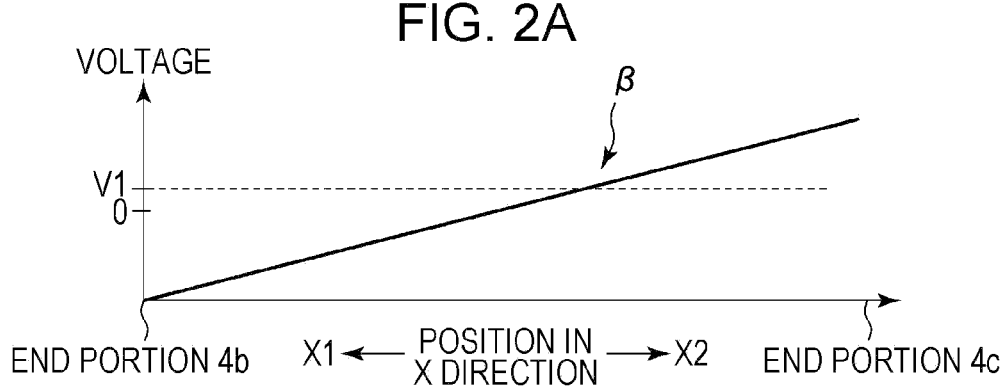
FIGS. 2A to 2C are schematic views each showing an example of a distribution of voltage applied to a first resistive layer different from that shown in FIG. 1C.

In FIG. 1C, the first driving circuit 19 applies a positive voltage to the first electrode 12 and the second driving circuit 20 applies a negative voltage to the first electrode 13. However, when the first driving circuit 19 applies a negative voltage to the first electrode 12 and the second driving circuit 20 applies a positive voltage to the first electrode 13, a voltage gradient β, which is opposite to the voltage gradient shown in FIG. 1C, can be generated in the first resistive layer 4 as shown in FIG. 2A. As a result, an oxidation-reduction reaction opposite to the above-described oxidation-reduction reaction is caused in the first electrochromic layer 6 and thus a gradation display 180° reversed from the gradation display shown in FIG. 1D can be obtained.

Figure 2B:
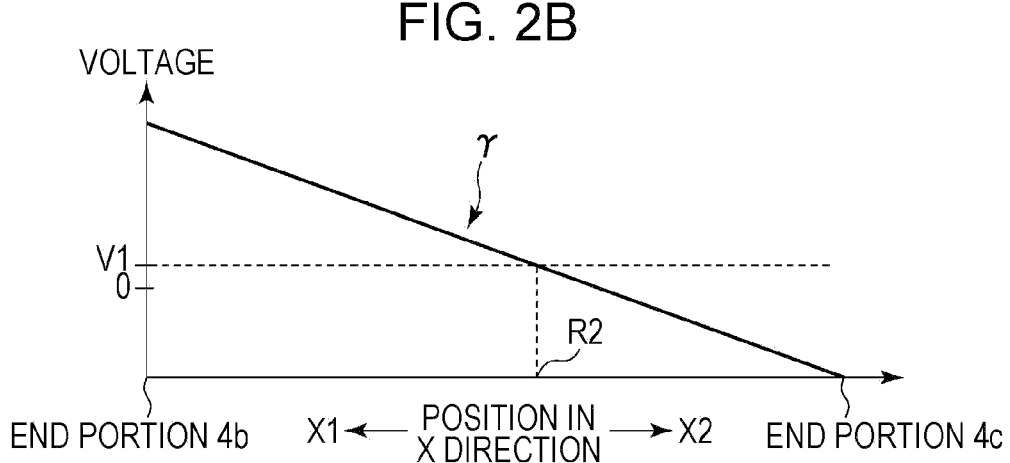

In FIG. 2B, the positive voltage applied to the first electrode 12 by the first driving circuit 19 is set to be higher than that of the case shown in FIG. 1C. Note that the negative voltage applied to the first electrode 13 by the second driving circuit 20 is the same as that of the case shown in FIG. 1C. This can increase the slope of the resultant voltage gradient y compared with the voltage gradient shown in FIG. 1C. Therefore, the position of the first resistive layer 4 that corresponds to the coloring voltage V1 shifts from a position R1 of FIG. 1C to a position R2 of FIG. 2B. The length of the region from the X1-side end portion 4b to the position R2 in FIG. 2B is larger than the length of the region from the X1-side end portion 4b to the position R1 in FIG. 1C. Thus, the case shown in FIG. 2B has a large oxidation reaction region of the first electrochromic layer 6 compared with the case shown in FIG. 1C. That is, the colored region of the first electrochromic layer 6 widens in the X2 direction compared with the colored region shown in FIG. 1D, and the gradation region (region where a shade of color gradually (continuously) changes) can be positioned to the X2-side end portion 4c side compared with the gradation region shown in FIG. 1D.

When the slope of the voltage gradient y is steeper than that of the voltage gradient a of FIG. 1C as shown in FIG. 2B, the oxidation reaction region and the reduction reaction region of the first electrochromic layer 6 steeply change in the X1-X2 direction. Therefore, the width of the gradation region (region where a shade of color gradually (continuously) changes) in the X1-X2 direction can be decreased.

By changing the positive voltage and the negative voltage applied to the electrodes 12 and 13, the slope of the voltage gradient can be decreased compared with those shown in FIGS. 1C and 2A.

The case where a positive voltage is applied to one of the first electrodes 12 and 13 and a negative voltage is applied to the other has been described above. However, as shown in FIG. 2C, a voltage gradient 8 may be generated between the first electrodes 12 and 13 of the first resistive layer 4 by setting the second electrodes 14 and 15 at ground potential and by applying different voltages (positive voltages) higher than those of the second electrodes 14 and 15 to the first electrodes 12 and 13.

Some cases where a voltage gradient is generated in the first resistive layer 4 have been described above. However, obviously, the same voltage can be applied to the first electrode 12 by the first driving circuit 19 and to the first electrode 13 by the second driving circuit 20 so that the entire first resistive layer 4 is controlled to have a uniform voltage, whereby the entire first electrochromic layer 6 can be colored or decolorized. In this embodiment, by applying a voltage from both sides of the first resistive layer 4, control can be performed so that the entire first resistive layer 4 quickly comes to have a uniform voltage. As a result, the entire first electrochromic layer 6 can be quickly colored or decolorized.

Figure 2C:
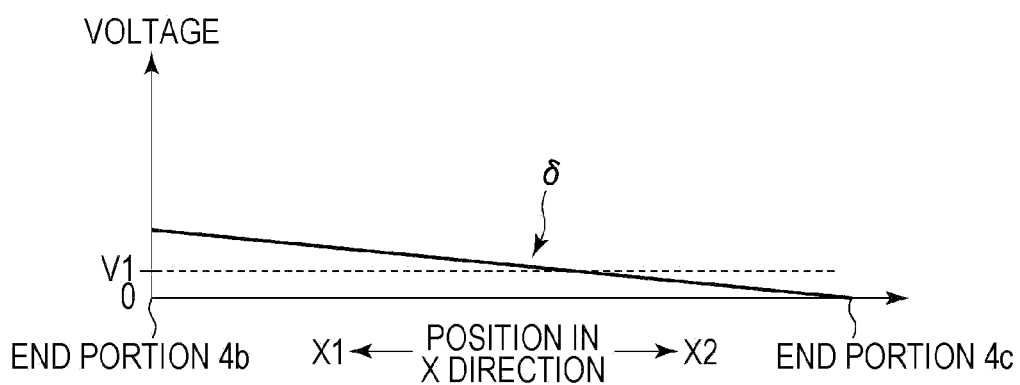

In this embodiment, the gradation display shown in FIG. 1D can be retained and the voltage gradients shown in FIGS. 2A to 2C can be reversed. Furthermore, the gradation display can be dynamically changed by continuously or intermittently changing the slope of the voltage gradient during displaying.

In the display device 1 shown in FIG. 1A, the plurality of electrodes 12 to 15 connected to the first resistive layer 4 and the second resistive layer 5 are disposed at only both end portions in the X1-X2 direction. However, as shown in FIG. 3A, first electrodes 31 to 38 can be disposed at eight positions in total, specifically both end portions of a first resistive layer 30 in an X direction, both end portions of the first resistive layer 30 in a Y direction, and four corners of the first resistive layer 30.

Figure 3A:
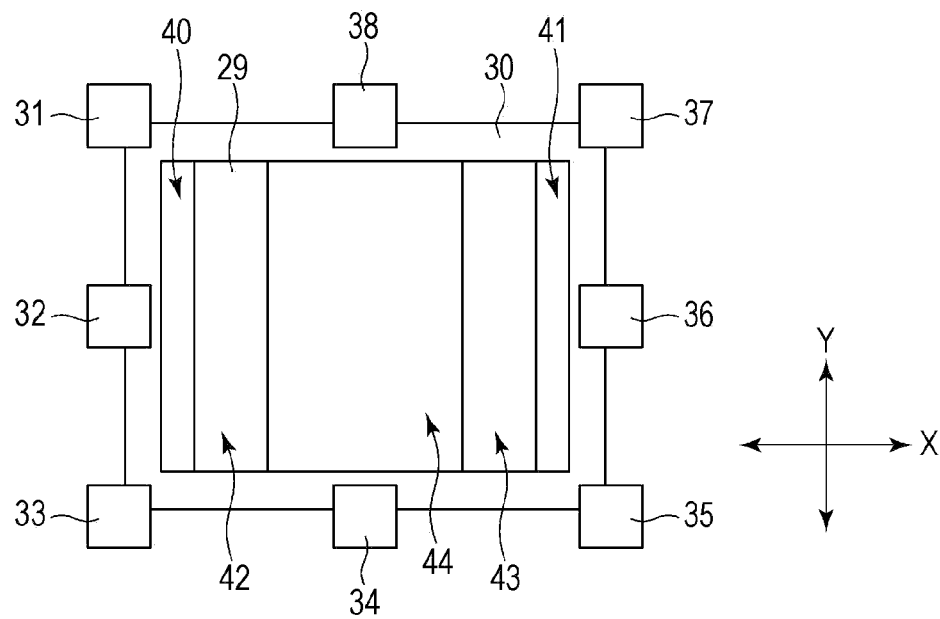
FIGS. 3A and 3B are plan views for describing the arrangement of a plurality of first electrodes connected to the first resistive layer different from that shown in FIG. 1B and for describing the display form of a first electrochromic layer.

Although not shown in FIG. 3A, eight second electrodes are also disposed on a second resistive layer that faces the first resistive layer 30 in the height direction. The eight second electrodes are disposed at the same positions as those of the first electrodes 31 to 38 when viewed in plan. By pairing the first electrodes 31 to 38 with the eight second electrodes that respectively face the first electrodes 31 to 38 in the height direction, eight feeding portions are formed.

By increasing the number of the first electrodes as described above, various chromatic displays can be achieved. For example, in the case where a first electrochromic layer 29 disposed on a surface of the first resistive layer 30 contains an electrochromic material that is colored by oxidation, a positive voltage (higher than the coloring voltage) is applied to the first electrodes 31, 32, 33, 35, 36, and 37 and a negative voltage is applied to the first electrodes 34 and 38. As a result, first regions 40 and 41 closest to the first electrodes 31, 32, 33, 35, 36, and 37 can be made to become colored regions; second regions 42 and 43 located inside the first regions 40 and 41 can be made to become gradation regions where the color gradually becomes lighter as the distance from the first regions 40 and 41 is increased; and a third region 44 located in the center of the first electrochromic layer 29 can be made to become a decolorized region.

In contrast, when a negative voltage is applied to the first electrodes 31, 32, 33, 35, 36, and 37 and a positive voltage is applied to the first electrodes 34 and 38, the first regions 40 and 41 can be made to become decolorized regions; the second regions 42 and 43 can be made to become gradation regions where the color gradually becomes deeper as the distance from the first regions 40 and 41 is increased; and the third region 44 can be made to become a colored region.

Figure 3B:
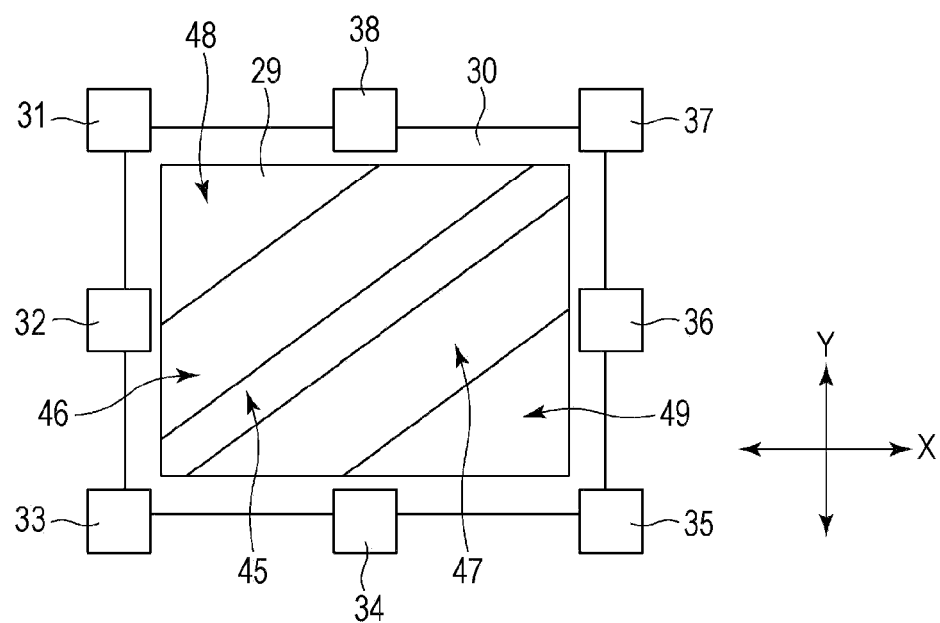

Alternatively, in FIG. 3B, a positive voltage (higher than the coloring voltage) is applied to the first electrodes 33 and 37 and a negative voltage is applied to the first electrodes 31 and 35. A voltage close to the coloring voltage is applied to the first electrodes 32, 34, 36, and 38, for example.

As a result, a colored region can be formed in an oblique direction of the first electrochromic layer 29. For example, as shown in FIG. 3B, an oblique fourth region 45 passing through the center can be made to become a colored region; fifth regions 46 and 47 located on both sides of the fourth region 45 can be made to become gradation regions where the color becomes lighter as the distance from the fourth region 45 is increased; and sixth regions 48 and 49 located outside the fifth regions 46 and 47 can be made to become decolorized regions.

By changing the voltage applied to the first electrodes 31 to 38, the place and width of the colored region, gradation region, and decolorized region can be suitably modified.

Furthermore, by changing the number and arrangement of the plurality of first electrodes connected to the first resistive layer, various chromatic displays other than a monochrome display can be easily and freely set.

Figure 4:
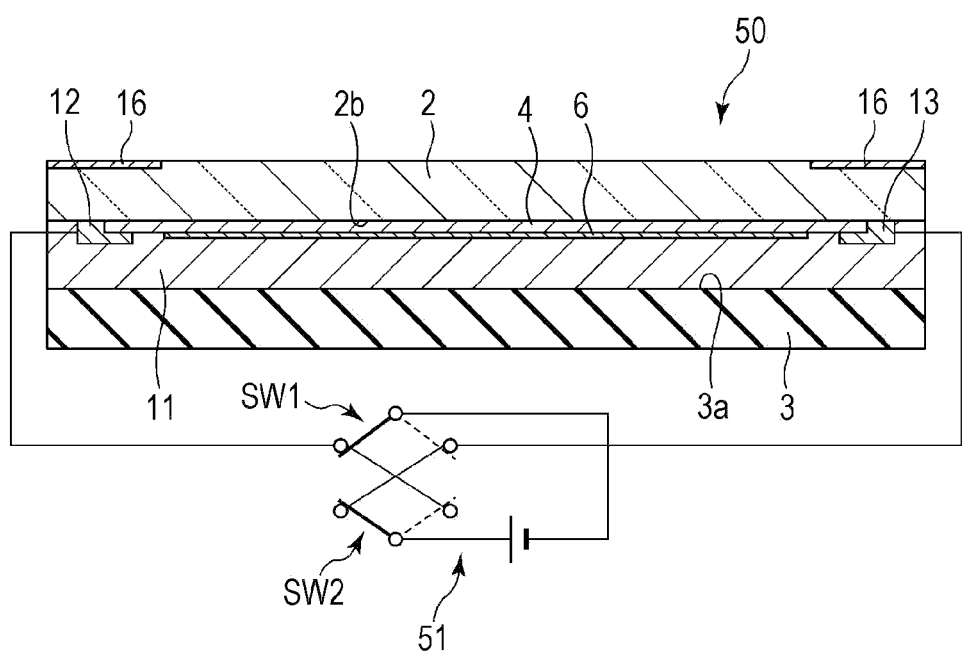
FIG. 4 is a partial longitudinal sectional view of a display device according to a second embodiment of the present invention.

FIG. 4 is a partial longitudinal sectional view of a display device according to a second embodiment of the present invention. Hereinafter, in FIG. 4, the same components as those in FIG. 1A are denoted by the same reference numerals as those in FIG. 1A.

In a display device 50 shown in FIG. 4, unlike the display device 1 shown in FIG. 1A, the second resistive layer 5, the second electrochromic layer 7, and the second electrodes 14 and 15 are not disposed on the inner surface 3a of the second insulating substrate 3.

On the other hand, the configuration of the first resistive layer 4, the first electrochromic layer 6, and the first electrodes 12 and 13 disposed on the inner surface 2b of the first insulating substrate 2 is the same as that shown in FIG. 1A.

In the display device 50 shown in FIG. 4, unlike the display device 1 shown in FIG. 1A, a driving circuit 51 is connected between the first electrode 12 and the first electrode 13. A voltage is applied between the first electrodes 12 and 13 by this driving circuit 51. Thus, a voltage gradient can be generated in the first resistive layer 4 located between the first electrodes 12 and 13. By switching switches SW1 and SW2 in the driving circuit 51, the voltage gradient generated in the first resistive layer 4 can be reversed.

As described above, by disposing the first resistive layer 4, the first electrochromic layer 6, and the first electrodes 12 and 13 and by applying a voltage between the first electrodes 12 and 13 to generate a voltage gradient in the in-plane direction of the first resistive layer 4, a chromatic display (e.g., gradation display) other than a monochrome display can be achieved on the first electrochromic layer 6.

What is claimed is:

1. A display device comprising:
   a first substrate having a display surface;
   a first resistive layer disposed on a surface of the first substrate, the surface being opposite the display surface;
   a first electrochromic layer disposed on a surface of the first resistive layer;
   an electrolyte layer disposed on a surface of the first electrochromic layer;
   a plurality of first electrodes connected to the first resistive layer;
   a second substrate facing the first substrate with a space therebetween in a height direction;
   a second resistive layer disposed on a surface of the second substrate; and
   a plurality of second electrodes connected to the second resistive layer,
   wherein a voltage is applied to the plurality of first electrodes so that a voltage gradient is generated in an in-plane direction of the first resistive layer,
   the electrolyte layer is disposed between the first electrochromic layer and the second resistive layer while the first electrochromic layer and the second resistive layer face each other,
   a voltage is applied between the second electrodes and the first electrodes connected to the first resistive layer, and
   different voltages are applied at a plurality of feeding portions each constituted by one of the first electrodes connected to the first resistive layer and a corresponding one of the second electrodes connected to the second resistive layer to generate a voltage gradient in the first resistive layer positioned between the first electrodes having different applied voltages.

2. The display device according to claim 1, wherein the first electrodes are disposed on at least both ends of the first resistive layer.

3. The display device according to claim 1, wherein the voltage gradient is generated in both the first resistive layer and the second resistive layer.

4. The display device according to claim 1, further comprising:
   a second electrochromic layer disposed on a surface of the second resistive layer,
   wherein the electrolyte layer is disposed between the first electrochromic layer and the second electrochromic layer.

5. The display device according to claim 1, wherein, by applying a positive voltage to the first electrodes of some of the feeding portions and applying a negative voltage to the first electrodes of other feeding portions, a voltage gradient is generated in the first resistive layer positioned between the first electrodes to which the positive voltage has been applied and the first electrodes to which the negative voltage has been applied while a voltage gradient opposite to the voltage gradient of the first resistive layer is generated in the second resistive layer.

* * * * *